Figures 1, 2, 3:
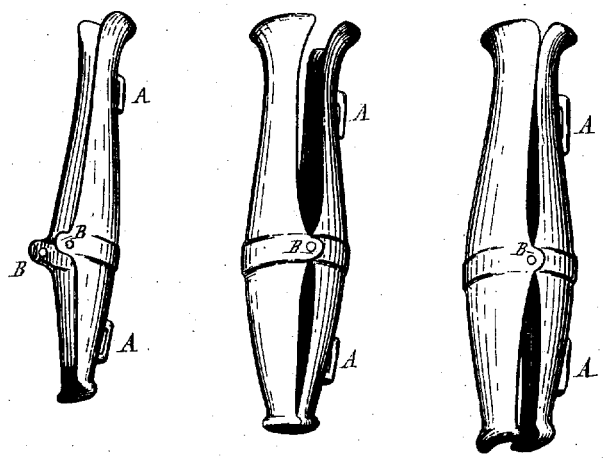

H. M. CURTIS & A. WORDEN,
Said CURTIS Assignor to J. S. WORDEN.

Whip-Holder.

No. 8,581. Reissued Feb. 18, 1879.

Attest:
A. Barthel
Charles J. Hand

Inventor:
H. M. Curtis
A. Worden
By Atty
Thos. S. Sprague

N. PETERS, PHOTO-LITHOGRAPHER, WASHINGTON, D. C.

UNITED STATES PATENT OFFICE.

HENRY M. CURTIS AND ALVA WORDEN, OF YPSILANTI, MICHIGAN; SAID CURTIS ASSIGNOR TO JOHN S. WORDEN, OF SAME PLACE.

IMPROVEMENT IN WHIP-HOLDERS.

Specification forming part of Letters Patent No. 70,075, dated October 22, 1867; Reissue No. 8,581, dated February 18, 1879; application filed December 7, 1878.

*To all whom it may concern:*

Be it known that we, HENRY M. CURTIS and ALVA WORDEN, of Ypsilanti, in the county of Washtenaw and State of Michigan, have invented a new and useful Machine for Holding Carriage-Whips; and we do hereby declare that the following is a full, clear, and exact description of the construction and operation of the same, reference being had to the annexed drawings, making a part of this specification, in which—

Figure 1 is a separate view of one section of the whip-holder; Fig. 2, a view of the complete whip-holder, open at the top to receive a whip; and Fig. 3, a view of the holder with the parts in the position they assume when holding a whip.

The whip-holder is formed of metal, cast or pressed to the desired shape, and is composed of two pieces only, Fig. 1 representing one sectional half, and the other sectional half being formed exactly like it, with the exception of the loops A A, used for the purpose of attaching the same to the carriage-seat or dash-board.

Each part of the whip-holder is made in the general shape of the vertical halves of two hollow cones of different heights, joined together at their bases, the section of the short cone forming the bottom of the holder, so that the bilge (at the junction of the two half-cones) will be below the vertical center of the holder.

The upper end of each part of the holder is flared outwardly to give easy entrance to the butt of the whip, while the lower end of each part is partially closed up, so as to prevent the whip from being in any case pushed through the holder.

The sections are connected together at the bilge by ear-shaped hinges B on each half-section, the ears being connected together by rivets forming the hinge.

The edge or face of each cylinder-section forms an obtuse angle at the hinge, and the sections are so constructed that when the two sections are connected together at the hinge B the whip-holder opens above the joints or hinge, and shuts or closes below from its own weight, as in Fig. 2.

When the whip is inserted the holder opens at the bottom, below the joints or hinge, by the pressure of the whip upon the convex conical sides of the holder, and closes at the top of the holder around the whip, thus clasping the whip firmly at the top and bottom of the holder, and holding it steady and firmly in its place.

The whip may be easily drawn out by a perpendicular motion, the holder opening at the top and closing at the bottom, so that the whip is readily detached.

It will be noticed, in addition, that by dividing the socket throughout its length a larger opening will be disclosed at its top for the reception of the whip when the socket is open, and the whip can be more easily entered into the socket; also, by dividing the socket into two halves of similar shape the whip will be more firmly held, and can be more readily removed from the socket.

What we claim as our invention is—

1. A whip-holder consisting of the parts A B, of double conical shape, and connected together at the bilge by a pivotal joint, substantially as described.

2. A whip-holder divided throughout its length into two parts, hinged together so that the holder will disclose a large opening for the reception of the whip, and will be closed at its top around the whip when the same is inserted into the holder, substantially as set forth.

3. A whip-holder composed of two parts, hinged together, with the inner edges of each part cut away from the point of hinging to the ends, to allow the parts to work upon the joints without overlapping each other, substantially as shown.

4. A whip-holder composed of two parts, of double conical shape, hinged together as described, and wherein one of the halves of the holder is provided with loops or fastenings, by means of which the holder is attached to a carriage-seat or dash-board, substantially as specified.

HENRY M. CURTIS.
ALVA WORDEN.

Witnesses:
FRANK JOSLIN,
O. JOSLIN.